(No Model.)
I. BIRGE.
ROLLER FOR STORE SERVICE APPARATUS.
No. 300,681. Patented June 17, 1884.
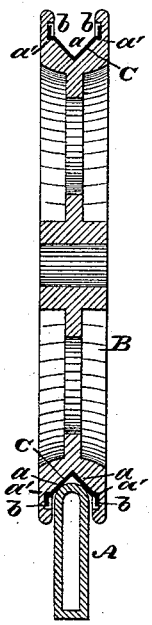
WITNESSES:
A. P. Grant,
W. F. Kircher
INVENTOR:
Isidore Birgé
BY Joshua Diedersheim
ATTORNEY.

UNITED STATES PATENT OFFICE.

ISIDORE BIRGÉ, OF PHILADELPHIA, PENNSYLVANIA.

ROLLER FOR STORE-SERVICE APPARATUS.

SPECIFICATION forming part of Letters Patent No. 300,681, dated June 17, 1884.

Application filed May 16, 1884. (No model.)

*To all whom it may concern:*

Be it known that I, ISIDORE BIRGÉ, a citizen of the United States, residing in the city and county of Philadelphia, State of Pennsylvania, have invented a new and useful Improvement in Rollers for Store-Service Apparatus, &c., which improvement is fully set forth in the following specification and accompanying drawing, in which the figure is a diametrical section of a roller or wheel for store-service apparatus embodying my invention, the object of which is to adapt the roller or wheel to run comparatively noiselessly on the track or rail, and with but small friction.

Referring to the figure on the drawing, which represents a sectional view, A represents a track or rail of a store-service apparatus, and B represents a roller or wheel adapted to run on said track or rail, and carrying the basket, cage, or conveyer of said apparatus. The circumference of the roller is grooved, partly V-shaped, as at $a$, and the sides of the groove, near the periphery of the roller, are recessed laterally, as at $b\ b$, the groove receiving a band, C, of soft rubber, which is stretched and sprung into the groove so as to embrace the walls of the portion $a$, the ends of the band entering the recesses $b$. The portion of the wall of the groove at the place of junction of the recesses $b$ with the portion $a$ project toward each other, forming ridges $a'$, the rubber-clad faces of which are in contact with the tread of the track or rail, making two distinct points of contact of the roller or wheel with said track or rail, the effect of which is to cause the roller or wheel to run comparatively noiselessly, obviating the objection to the rattling and general noise heretofore occasioned in articles of the class, it being noticed that the small points of contact of the roller or wheel with the track or rail cause the roller or wheel to run easily, steadily, and uniformly, the band securely retaining its hold on the roller as it tightly embraces the walls of the groove $a$, the ridges $a'$ and the recesses $b$ being stretched or sprung thereover, it also being noticed that the ends of the band are buried in the recesses $b$, and thus prevented from being worn by the roller. When the roller is loaded, the friction of the same with the track is increased, thus controlling the speed of the roller, and said speed is further controlled as the roller is loaded to a greater extent.

It is evident that the roller, as clad, is applicable to cable railways and other devices where a noiseless or comparatively noiseless pulley or roller is desired.

Having thus described my invention, what I claim as new, and desire to secure by Letters Patent, is—

1. A roller having a circumferential groove which is clad with elastic material sprung thereinto, substantially as and for the purpose set forth.

2. A roller having a circumferential groove the sides whereof are formed with ridges, and a band of elastic material embracing said ridges, substantially as and for the purpose set forth.

3. A roller having a groove the sides whereof are formed with ridges $a'$ and recesses $b$, and a band of elastic material fitted to said groove, substantially as and for the purpose set forth.

ISIDORE BIRGÉ.

Witnesses:
    JOHN A. WIEDERSHEIM,
    W. F. KIRCHER.